United States Patent [19]

Kita et al.

[11] Patent Number: 4,776,233

[45] Date of Patent: Oct. 11, 1988

[54] HYDROMECHANICAL TRANSMISSION AND HYDROMECHANICAL SPEED-CHANGE MECHANISM

[75] Inventors: Yasuo Kita, Kyoto; Hiroyuki Fujii, Uji, both of Japan

[73] Assignee: Shimadzu Corporation, Kyoto, Japan

[21] Appl. No.: 921,092

[22] Filed: Oct. 21, 1986

[51] Int. Cl.⁴ .......................................... F16H 47/04
[52] U.S. Cl. .................................... 74/687; 74/866
[58] Field of Search ............... 74/687, 677, 733, 681, 74/720, 720.5, 718, 752 D, 866, 674, 732

[56] References Cited

U.S. PATENT DOCUMENTS

| | | | |
|---|---|---|---|
| 3,714,845 | 2/1973 | Mooney, Jr. | 74/687 |
| 3,722,324 | 3/1973 | Cordner et al. | 74/687 |
| 3,884,095 | 5/1975 | Miyao et al. | 74/687 |
| 3,903,755 | 9/1975 | Polak | 74/687 |
| 3,903,756 | 9/1975 | Hamma | 74/687 |
| 3,943,715 | 3/1976 | Miyao et al. | 74/687 X |
| 3,969,958 | 7/1976 | Miyao et al. | 74/687 |
| 3,979,972 | 9/1976 | Sakai et al. | 74/687 |
| 4,242,922 | 1/1981 | Baudoin | 74/687 |
| 4,286,477 | 9/1981 | Meyerle et al. | 74/687 |
| 4,304,151 | 12/1981 | Meyerle et al. | 74/687 |
| 4,306,467 | 12/1981 | Pollman | 74/687 |
| 4,313,351 | 2/1982 | Hagin | 74/687 |
| 4,341,131 | 7/1982 | Pollman | 74/687 |
| 4,341,132 | 7/1982 | Burdick | 74/687 |
| 4,368,653 | 1/1983 | Mizuno et al. | 74/687 |
| 4,446,756 | 5/1984 | Hagin et al. | 74/687 |
| 4,491,034 | 1/1985 | Fredriksen | 74/687 |
| 4,519,274 | 5/1985 | Maruyama | 74/687 X |

OTHER PUBLICATIONS

"Hydrostatic Engineering", Ishihara, publisher: Asakura-Shoten, Jun. 10, 1968.
"Theory and Practice of Piston Pump Motor", Ishihara, publisher: OHM SHA, May 20, 1979.

*Primary Examiner*—Leslie A. Braun
*Assistant Examiner*—David Novais
*Attorney, Agent, or Firm*—Armstrong, Nikaido, Marmelstein & Kubovcik

[57] ABSTRACT

A hydromechanical transmission that can be used as an efficient continuously variable transmission has a pair of speed sensors for detecting the rotational speeds at the transmission ends of two mechanical transfer lines formed in the transmission, a pair of pressure sensors for detecting the pressures at two positions, an actuator, and a computer. The computer controls the actuator and two clutches in such a way that the system is switched from a low-speed mode to a high-speed mode and vice versa without producing a shock.

7 Claims, 1 Drawing Sheet

HYDROMECHANICAL TRANSMISSION AND HYDROMECHANICAL SPEED-CHANGE MECHANISM

FIELD OF THE INVENTION

The present invention relates to a hydromechanical transmission which can be used in various industrial fields as an efficient continuously variable transmission.

BACKGROUND OF THE INVENTION

A hydrostatic power transmission which uses hydraulic pump/motors and is employed as a continuously variable transmission has been known. This transmission has the advantage that speed can be continuously varied. However, its efficiency is not always high. Further, the range of speeds is not satisfactorily wide. Accordingly, a hydromechanical transmission (HMT) has been developed and published in which such a hydrostatic power transmission (HST) is used in conjunction with differential gears and the transmission of power is shared with the HST and the differential gears so as to attain a high transmission efficiency of the gearing as well as the continuous variableness of the HST. See Chieo Ishihara: "Hydrodynamic Engineering," Asaka-shobo Japan and Sadao Ishihara: "Theory and Practice of Piston Pump Motor," Corona-sha, Japan. Furthermore a hydromechanical transmission developed by one of the same inventors of the instant invention is commonly owned and disclosed in co-pending U.S. application Ser. No. 921,099, filed on Oct. 21, 1986. Such a transmission includes a differential mechanism having first, second, third input/output ends and forming either a first mechanical transfer line for low speeds between the first and second input/output ends or a second mechanical transfer line for high speeds between the first and third input/output ends; a hydraulic power transmission mechanism having two hydraulic pump/motors one of which acts as a hydraulic pump when the other functions as a hydraulic motor, the input/output shaft of one of the pump/motors being connected to the second input/output end of the differential mechanism, the input/output shaft of the other pump/motor being connected to the third input/output shaft, the two pump/motors cooperating to constitute continuous variable hydraulic power transmission lines; a low-speed clutch for bringing the transmission end of the first mechanical transfer line into and out of engagement with a common rotary element disposed on the input or output side; and a high-speed clutch for bringing the transmission end of the second mechanical transfer line into and out of engagement with the common rotary element. When one of the clutches is engaged, the other is disengaged and vice versa to select either the low-speed or high-speed mode.

In the above structure, when it is switched from one mode to the other, a shock tends to occur. Specifically, in this transmission, a portion of the applied power is transmitted toward the output via one mechanical transfer line including gears. The remaining power is directed toward the output via the hydraulic power transmission line including pump/motors, so that this power is added to the power which is transmitted by the mechanical transfer line. When a load is applied to the hydraulic transmission line, rotary output from this line tends to lag the output from the mechanical transfer line, because of leakage of the working fluid inside the pump/motors and because of the effects of the elasticity of the hydraulic circuit. In this conventional structure, when it is switched from one mode to the other, the roles of the two pump/motors, i.e., the pump/motors, are interchanged as described later. For this reason, the effect of the aforementioned lag is exerted in reverse. Therefore, when the transmission is switched from the low-speed mode to the high-speed mode, for example, if the low-speed clutch is disengaged and, at the same time, the high-speed clutch is engaged just when the rotational speed at the transmission end of the second mechanical transfer line becomes equal to the rotational speed at the transmission end of the first mechanical transfer line or after a certain period elapses since the coincidence of the speeds, then the transmission of torque from the first mechanical transfer line to the common rotary element will be suddenly interrupted. This causes an indeterminate idling region that might be called a backlash of the whole system to be momentarily absorbed. Then, torque is transmitted from the second mechanical transfer line to the common rotary element. Consequently, a large mechanical shock often occurs momentarily when such a switching operation is performed.

SUMMARY OF THE INVENTION

It is an object of the invention to provide a hydromechanical transmission which is equipped with a relatively simple structure to certainly prevent the occurrence of a shock when the system is switched from one mode to the other.

The above object is achieved by a hydromechanical transmission which makes use of the above-described mode switching system and which comprises: a speed-detecting means for detecting the rotational speeds at the transmission ends of the aforementioned first and second mechanical transfer lines; a torque-detecting means for detecting the manner of transmission of torque at the transmission ends; and a control means for engaging the clutches when the rotational speeds at the transmission ends are found to be equal by the speed-detecting means, for correcting the change speed ratio of the hydraulic power transmission mechanism described above until the manner of transmission of torque at one transmission end and the manner of transmission of torque at the other transmission end which are detected by the torque-detecting means are interchanged, and for disengaging the clutch through which torque is no longer transmitted when the correction has been completed.

In the low-speed mode, the transmission end of the first mechanical transfer line formed between the first and second input/output ends of the differential mechanism is connected to a common rotary element mounted on the output or input side via the clutch for low speed. A portion of the applied power is directed to the output via the hydraulic transfer lines formed by the hydraulic power transmission mechanism. In this case, one of two pump/motors acts as a motor, while the other functions as a hydraulic pump.

In the high-speed mode, the transmission end of the second mechanical transfer line formed between the first and third input/output ends of the differential mechanism is connected to the common rotary element. A portion of the applied power is delivered through this mechanical transfer line. The remaining power is directed toward the output via the hydraulic transfer lines formed by the hydraulic power transnmission mechanism. In this case, the roles of the two pump/motors are interchanged. That is, the said one pump/motor acts as a hydraulic pump, whereas the other pump/motor functions as a motor.

The system is switched from the low-speed mode to the high-speed mode in the manner described below. When the clutch for low speed is engaged, if the rotational speed at the transmission end of the second mechanical transfer line becomes equal to the rotational speed at the transmission end of the first mechanical transfer line, then the clutch for high speeds is also engaged. Then, the change speed ratio of the hydraulic power transmission line is corrected until the transmission of torque from the first mechanical transfer line to the common rotary element ceases and torque is transmitted from the second mechanical transfer line to the common rotary element. Subsequently, the clutch for low speed is disengaged. The system is switched from the high-speed mode to the low-speed mode in the manner opposite to that described above.

Other objects and features of the invention will appear in the course of description that follows.

DETAILED DESCRIPTION OF THE INVENTION

Figure 1:
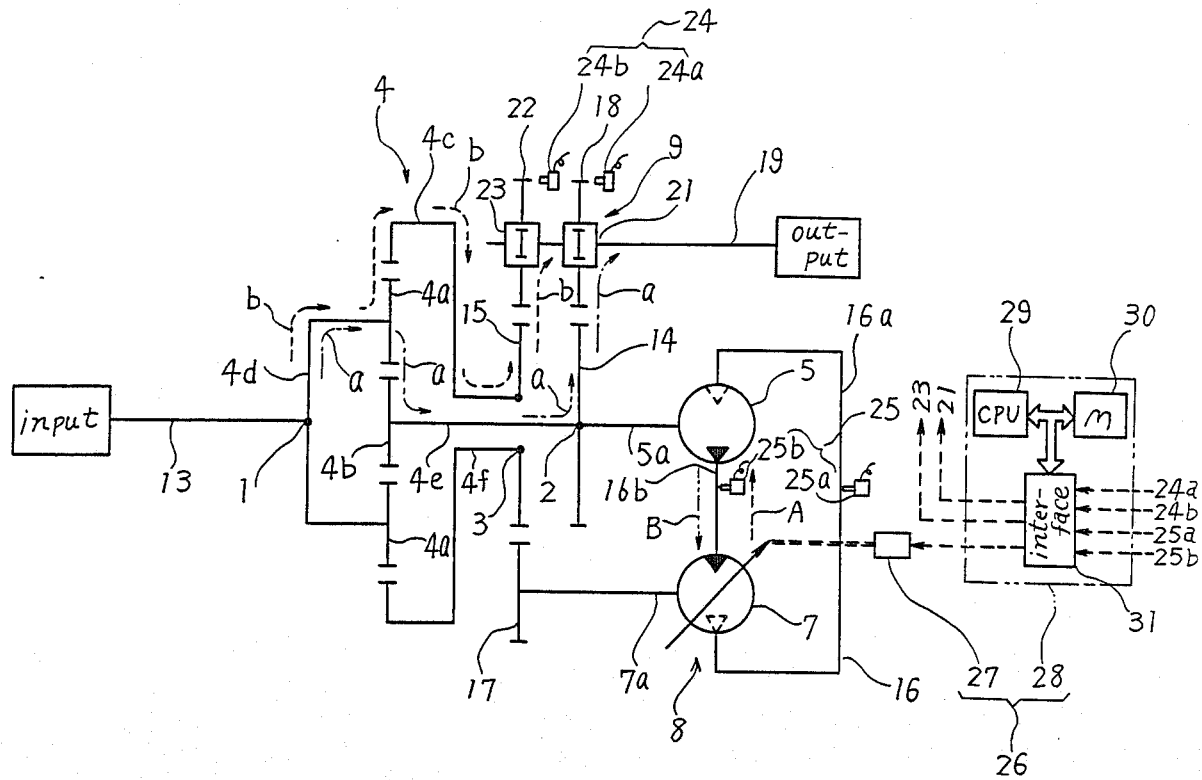
FIG. 1 is a flow line diagram for illustrating a hydromechanical transmission according to the instant invention.

A hydromechanical transmission according to the invention is schematically shown in FIG. 1. This transmission has a differential mechanism 4, a hydraulic power transmission mechanism 8, and a mode selector mechanism 9. The differential mechanism 4 has first, second, third input/output ends 1, 2, 3, respectively, and forms either a first mechanical transfer line a between the first end 1 and the second end 2 or a second mechanical transfer line b between the first end 1 and the third end 3. The hydraulic power transmission mechanism 8 has a hydraulic pump/motor 5 of a fixed displacement type and a hydraulic pump/motor 7 of a variable displacement type. The input/output shaft 5a of the pump/motor 5 is connected to the second end 2 of the differential mechanism 4. The input/output shaft 7a of the pump/motor 7 is coupled to the third end 3. The pump/motors 5 and 7 cooperate to constitute continuously variable hydraulic transmission lines A and B. The mode selector mechanism 9 selects either a low-speed mode, in which the output of the hydromechanical transmission is connected to the input via the first mechanical transfer line a, or a high-speed mode, in which the output is connected to the input via the second mechanical transfer line b.

The differential mechanism 4 is a planetary gear train consisting of planet gears 4a circumferentially and regularly spaced apart from one another and a sun gear 4b disposed inside the planet gears 4a. The planet gears 4a are in mesh with an outside ring gear 4c. The planet gears 4a are held by a gear retainer 4d. The first input/output end 1 is provided at the center of this retainer 4d. An input shaft 13 is mounted to first input/output end 1. The sun gear 4b is supported on a pivot 4e, which is used as the second input/output end 2. A gear 14 is fixedly secured to the second end 2. The ring gear 4c has a boss 4f that is used as the third input/output end 3. A gear 15 is coupled to the third end 3.

In the hydraulic power transmission mechanism 8, the pump/motor 5 of a fixed displacement type is connected in series with the pump/motor 7 of a variable displacement type via a hydraulic circuit 16, in the same manner as in an ordinary hydrostatic power transmission. The input/output shaft 5a of the pump/motor 5 is coupled to the pivot 4e of the sun gear 4b. The input/output shaft 7a of the pump/motor 7 is connected to the ring gear 4c by means of a gear 17.

The mode selector mechanism 9 comprises a clutch 21 for low speeds and a second clutch 23 for high speeds. The clutch 21 is mounted between a low-speed gear 18 and the output shaft 19 of the present transmission. The gear 18 meshes with the gear 14 at the second input/output end 2, and constitutes the transmission end of the first mechanical transfer line a. The clutch 23 for high speeds is mounted between a high speed gear 22 and the output shaft 19. The gear 22 meshes with the gear 15 at the third input/output end 3, and constitutes the transmission end of the second mechanical transfer line b.

The hydromechanical transmission further has a speed-detecting means 24 for detecting the rotational speeds of the gears 18 and 22 forming the transmission ends of the mechanical transfer lines a and b, a torque-detecting means 25 for detecting the manner of transmission of torque at the gears 18 and 22, and a control means 26. This control means 26 acts to engage the clutches 21 and 23 when the rotational speeds of the gears 18 and 22 which are detected by the detecting means 24 become equal. The control means 26 further corrects the change speed ratio of the hydraulic power transmission mechanism 8 until the manner of transmission of torque at one transmission end and the manner of transmission of torque at the other transmission end which are detected by the detecting means 25 are interchanged. Upon completion of the correction, the control means 26 disengages the clutch 21 or 23 through which torque is no longer transmitted.

More specifically, the speed-detecting means 24 has a pair of speed sensors 24a, 24b. One sensor 24a detects the rotational speed of the low-speed gear 18 and converts it into a corresponding electrical signal. The other sensor 24b detects the rotational speed of the high-speed gear 22 and converts it into a corresponding electrical signal.

The torque-detecting means 25 has a pair of pressure sensors 25a, 25b. One sensor 25a detects the pressure inside the circuit portion 16a of the hydraulic circuit 16 of the hydraulic transmission mechanism 8 which is subjected to a high pressure when the low-speed mode is selected, and the sensor 25a converts it into a corresponding electrical signal. The other sensor 25b detects the pressure inside the circuit portion 16b of the hydraulic circuit 16 which undergoes a high pressure when the high-speed mode is selected.

The control means 26 has an actuator 27 for changing the displacement of the pump/motor 7 and a computer 28 for controlling the actuator 27 and the clutches 21, 23. The actuator 27 consists of an electro-hydro servomechanism or similar mechanism. Where the pump/motor 7 of variable displacement type is of the swash plate type or the bent axis type, the angle of the swash plate or the bent axis is varied. Where the pump/motor 7 is of the radial piston type or the static pressure balanced type, the eccentric position of the pintle is varied.

The computer 28 is an ordinary microcomputer system comprised of a central processing unit (CPU) 29, a memory 30, and an interface 31. The interface 31 receives signals from the rotational speed sensors 24a, 24b and from the pressure sensors 25a, 25b. The interface 31 delivers instruction signals to the actuator 27 and to the clutches 21, 23. A program has been previously stored in some portions of the memory 30 to perform the following operations. In the low-speed mode where only the clutch 21 for low speeds is engaged, the rotational speed of the high-speed gear 22 increases until it is found to have reached the rotational speed of the low-speed gear 18, whereupon an instruction signal is also given to the high-speed clutch 23 to engage it. As a result, the clutches 21 and 23 are engaged. The output values P and Q which are derived at this time from the pressure sensors 25a and 25b, respectively, are temproarily stored in the memory 30. Thereafter, an instruction signal for correction is delivered to the actuator 27 to operate it. This operation is continued until the values of the output signals from the sensors 25a and 25b assume the values of Q and P, respectively, stored in the memory 30. Then, the actuator 27 is stopped and the clutch 21 for low-speeds is disengaged. Thus, the system is switched to the high-speed mode. When the system is switched from the high-speed mode to the low-speed mode, the clutches 21 and 23 are engaged or disengaged and the actuator 27 is operated in a similar manner.

In the illustrated embodiment, rotary power from an engine or the like is applied to the input shaft 13 provided at the input/output end 1 of the differential mechanism 4. Rotary power is delivered from the output shaft 13 which is connected to the second input/output end 2 or the third input/output end 3 by means of the mode selector mechanism 9. Then, the power is transmitted to the drive wheels of a vehicle or the like.

Figure 2:
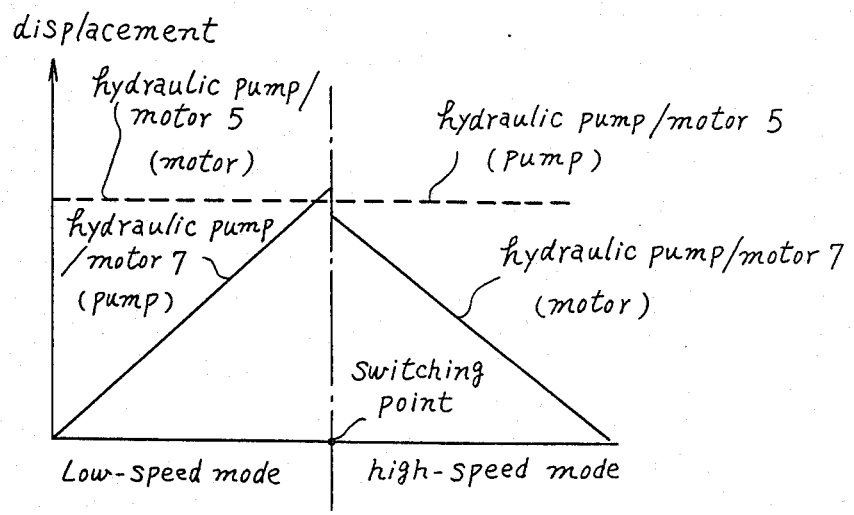
FIG. 2 is a graph for illustrating the operation of the transmission shown in FIG. 1.

In the operation of the hydromechanical transmission constructed as described above, when the low-speed mode is selected, the low-speed clutch 21 is engaged but the high-speed clutch 23 is not engaged. Under this condition, the output is connected to the input through the low-speed mechanical transfer line a formed between the first end 1 and the second end 2 of the differential mechanism 4. Thus, a portion of the applied power is transmitted to the output shaft 19 via the mechanical transfer line a. At this time, as shown in FIG. 2, the pump/motor 7 acts as a pump, while the pump/motor 5 functions as a motor. Accordingly, the rotary power appearing at the third end 3 of the differential mechanism 4 is transmitted to the output shaft 19 via the hydraulic transmission line A that is formed between the pump/motors 7 and 5. In this low-speed mode, as the displacement of the pump/motor 7 is increased, the rotational speed of the output shaft 19 increases relative to the rotational speed of the input shaft 13. Specifically, when the displacement of the pump/motor 7 having a variable displacement is zero, the third input/output end 3 of the differential mechanism 4 runs substantially at idle. Therefore, the output shaft 19 connected to the second input/output end 2 of the differential mechanism 4 is substantially at a standstill. Then, as the displacement of the pump/motor 7 is increased, the rotational speed at the third end 3 decreases relatively, and the speed at the second end 2 increases relatively, and when the two speeds are equal, the low speed clutch 21 of the mode selector mechansim 9 is disengaged, while the high-speed clutch 23 is engaged to select the high-speed mode. In this state, a switching opreation is carried out as described later to select the high-speed mode.

In this high-speed mode, the mechanical transfer line b is formed between the first end 1 and the third end 3 of the differential mechanism 4 and a portion of the applied power is transmitted to the output shaft 19 via this line b. At this time, as shown in FIG. 2, the pump/motor 7 functions as a motor, whereas the pump/motor 5 acts as a pump. Thus, the rotary power appearing at the second end 2 of the differential mechanism 4 is transmitted to the output shaft 19 via the hydraulic transmission line B that is formed between the pump/motors 5 and 7. In this high-speed mode, as the displacement of the pump/motor is reduced, the rotational speed of the output shaft 19 increases relative to the roational speed of the input shaft 13. In other words, as the displacement of the pump/motor 7 is reduced, the speed at the third end 3 increases relatively, while the rotational speed at the second end 2 decreases relatively.

The system is switched from the low-speed mode to the high-speed mode in the manner described below. The rotational speed of the high-speed gear 22 approaches the rotational speed of the low-speed gear 18 and becomes equal to the latter speed. At this instant, the control means 26 issues an instruction signal to the clutch 23 for high speeds to engage it. Thus, both clutches 21 and 23 are engaged. The output values P and Q obtained from the pressure sensors 25a and 25b are still temporarily stored in the memory 30. Under this condition, torque is transmitted from the low-speed gear 18 in the first mechanical transfer line a to the ouptut shaft 19, or the common rotary element, but no torque is tranferred from the high-speed gear 22 in the second mechanical transfer line b to the output gear 19. Subsequently, an instruction signal for correction is delivered from the computer 28 to the actuator 27 so that the actuator 27 operates to reduce the displacement. This operation is continued until the output values from the sensors 25a and 25b become equal to Q and P, respectively, previously stored in the memory 30. More specifically, the displacement of the pump/motor 7 is corrected until the output value from the sensor 25a changes from a high pressure value of P to a low pressure value of Q and the output value from the sensor 25b varies from Q to P. In the course of this operation, the roles of the two pump/motors 5 and 7 are completely interchanged. That is, the pump/motor that worked as a hydraulic pump acts now as a motor, while the pump/motor operated as a motor functions as a hydraulic pump. As a result, torque is no longer transferred from the low-speed gear 18 to the output shaft 19, but torque is transmitted from the high-speed gear 22 to the output shaft 19. Then, the correcting operation performed by the actuator 27 is stopped. At the same time, the clutch 21 for low speeds is disengaged to switch the system to the high-speed mode. When the system is switched from the high-speed mode to the low-speed mode, clutches 21 and 23 are engaged or disengaged and the actuator 27 is operated in a similar manner.

Since the novel transmission is constructed as described thus far, when it is switched from one mode to the other, the rotational speed and the torque change continuously, permitting the switching of mode without producing a shock. Further, the novel transmission is relatively simple in structure and easy to manufacture in practice, because it simply controls the instant at which the roles of the clutches 21 and 23 are interchanged and slightly corrects the change speed ratio of the hydraulic power transmission mechanism 8.

Although the differential mechanism is not limited to a planetary gear train, the use of such a gear train facilitates making the system compact. Further, the hydraulic power transmission mechanism is, of course, not limited to the structure described above, but rather various changes and modifications may be made thereto without departing from the scope of the invention. For instance, both pump/motors one of which acts as a hydraulic pump when the other pump/motor functions as a motor may be of the variable-displacement type.

Also, the torque-detecting means is not limited to the foregoing structure. For example, the torques acting on the low-speed and high-speed gears, or the transmission ends of the mechanical transfer lines, may be directly detected by the use of torque pickups. However, the pressure-detecting system already mentioned can simply and accurately detect the switching of the transmission path for torque.

Furthermore, the control means is not limited to a means using an electronic computer. A hydraulic control device equipped with a hydraulic logic circuit may also be employed. In the above embodiment, the differential mechanism is disposed on the input side to divide the input power. The invention is not limited to this structure. For example, it is also applicable to a structure where the output power is divided.

Since the novel hydromechanical transmisison is constructed as described thus far, it is equipped with a relatively simple structure that prevents occurrence of shock when the transmission is switched from one mode to the other.

I claim:

1. A hydromechanical transmission comprising:
   a differential mechanism having first, second, third input/output ends and forming either a first mechanical transfer line for low speeds between the first and second input/output ends or a second mechanical transfer line for high speeds between the first and third input/output ends;
   a hydraulic power transmission mechanism having a pair of hydraulic pump/motors one of which acts as a hydraulic pump when the other pump/motor functions as a hydraulic motor, an input/output shaft of one of the pump/motors being connected to the second input/output end of the differential mechanism, an input/output shaft of the other pump/motor being connected to the third input/output end, the pump/motors cooperating to constitute continuous variable hydraulic power transfer lines;
   a first clutch for low speeds, said first clutch acting to bring a transmission end of the first mechanical transfer line into and out of engagement with a common rotary element disposed on an input or output side;
   a second clutch for high speeds, said second clutch acting to bring a transmission end of the second mechanical transfer line into and out of engagement with the common rotary element, the second clutch being engaged for a high speed mode when the first clutch is disengaged and the first clutch being engaged for a low-speed mode when the second clutch is disengaged;
   a speed detecting means for detecting the rotational speeds at the transmission ends of the mechanical transfer lines;
   a torque-detecting means for detecting the manner of transmission of torque at the transmission ends; and
   a control means for controlling a smooth transition between said low-speed mode and said high-speed mode and vice versa, including means for engaging said first and second clutches when the rotational speeds at the transmission ends that are detected by the speed-detecting means become equal, means for correcting a change speed ratio of the hydraulic power transmission mechanism until the manner of transmission of torque at one transmission end and the manner of transmission of torque at the other transmission end which are detected by the torque-detecting means are interchanged, and means for disengaging the clutch through which torque is no longer transmitted when said correcting has been completed.

2. The hydromechanical transmission as set forth in claim 1, wherein said speed-detecting means consists of a pair of rotational-speed sensors.

3. The hydromechanical transmission as set forth in claim 1, wherein said torque-detecting means consists of a pair of pressure sensors.

4. The hydromechanical transmission as set forth in claim 1, wherein said control means includes an electronic computer.

5. The hydromechanical transmission as set forth in claim 1, wherein said control means includes a hydraulic control apparatus.

6. The hydromechanical transmission as set forth in claim 1, wherein the pump/motor connected to the second input/output end of the differential mechanism is of a fixed displacement type, while the pump/motor connected to the third input/output end is of a variable displacement type, and wherein said control means has an actuator for varying the displacement of the latter pump/motor and a computer for controlling the actuator and said two clutches.

7. A method for controlling a smooth transition between modes in a hydromechanical transmission having a low-speed mode and a high-speed mode, wherein said hydromechanical transmission includes,
   a differential mechanism having first, second, third input/output ends and forming either a first mechanical transfer line for low speeds between the first and second input/output ends or a second mechanical transfer line for high speeds between the first and third input/output ends,
   a hydraulic power transmission mechanism having a pair of hydraulic pump/motor one of which acts as a hydraulic pump when the other pump/motor functions as a hydraulic motor, an input/output shaft of one of the pump/motors being connected to the second input/output end of the differential mechanism, an input/output shaft of the other pump/motor being connected to the third input/output end, the pump/motors cooperating to constitute continuous variable hydraulic power transfer lines,
   a first clutch for low speeds, said first clutch acting to bring a transmission end of the first mechanical transfer line into and out of engagement with a common rotary element disposed on an input or output side,
   a second clutch for high speeds, said second clutch acting to bring a transmission end of the second mechanical transfer line into and out of engagement with the common rotary element, the second clutch being engaged for a high speed mode when the first clutch is disengaged and the first clutch being engaged for a low-speed mode when the second clutch is disengaged,
a speed detecting means for detecting the rotational speeds at the transmission ends of the mechanical transfer lines,
a torque-detecting means for detecting the manner of transmission of torque at the transmission ends, and
a control means for controlling said clutches and a change speed ratio of said hydraulic power transmission mechanism, and wherein said controlling method comprises the steps of:
detecting the rotational speeds of both transmission ends of the mechanical transfer lines;
engaging both said first and second clutches;
detecting the transmitted torque at each of the transmission ends after both of said clutches have been engaged;
controlling the change speed ratio of the hydraulic power transmission mechanism until the transmitted torque at each of the transmission ends has interchanged with one another; and
disengaging the clutch through which no torque is being transmitted, after said controlling steps.

* * * * *